United States Patent [19]

Baldwin

[11] Patent Number: 5,224,303
[45] Date of Patent: Jul. 6, 1993

[54] BRAKE ROTO FINISHING ADAPTOR

[76] Inventor: Paul R. Baldwin, 3905 Stanton St., Riverside, Calif. 92509

[21] Appl. No.: 702,763

[22] Filed: May 17, 1991

[51] Int. Cl.[5] .................. B24B 41/06; B24B 41/00; B25B 5/00
[52] U.S. Cl. .................. 51/217 R; 51/168; 51/237 R
[58] Field of Search .......... 51/217 R, 217 T, 237, 51/281 SF, 277, 168, 169, 237 R

[56] References Cited

U.S. PATENT DOCUMENTS

| | | | |
|---|---|---|---|
| 1,476,868 | 12/1923 | Weaver | 51/217 T |
| 3,754,747 | 8/1973 | Tateisi | 51/237 R |
| 3,857,207 | 12/1974 | Avrutin et al. | 51/237 R |
| 4,637,170 | 1/1987 | Block | 51/168 |
| 4,708,041 | 11/1987 | Granger | |
| 4,729,193 | 3/1988 | Gant et al. | 51/168 |
| 4,858,393 | 8/1989 | Yamada | 51/237 R |
| 4,955,744 | 8/1990 | Barth et al. | 51/168 |

OTHER PUBLICATIONS

"Ammco ® Brake Lathe Accessories", Ammco Tools, Inc., North Chicago, Ill.; pp. cover, table of contents, 4, 5; Aug. 1987.
"Ammco ® Brake Lathe Accessories", Hennessy Industries, Inc., LaVergne, Tenn.; pp. covers, table of contents, 3, 9, 15; May, 1989.
"High Tech Makes It Easy" brochure; High Tech Manufacturing, Irvine, Calif.; 1 p.; no date.
"The Composite Rotors on Many Late-Model Cars Require Special Attention" by L. Carley in Brake and Front End; pp. 8-11; Nov. 1989.
"High Tech Mounting Composite Rotor Adapter"; High Tech Manufacturing, Irvine, Calif.; 1 p.; no date.

*Primary Examiner*—Frank T. Yost
*Assistant Examiner*—Paul M. Heyrana, Sr.
*Attorney, Agent, or Firm*—Sheldon & Mak

[57] ABSTRACT

An adaptor for refinishing brake disk rotors includes a first flange member having a flange bore for closely fitting a rotatably mounted machine spindle member. The first flange member has an annular flange surface perpendicular to the flange bore for axial registration of the disk rotor, and a cavity for receiving a portion of the disk rotor. In one configuration, the adaptor includes a disk member having an accurately formed disk bore for closely fitting the spindle member, and an external shoulder for radial registration of a centering diameter of the rotor; and a second flange member for clamping the mounting flange against the flange surface by a clamping nut of the spindle member, whereby the disk rotor rotates rigidly with the spindle member. In another configuration, the first flange member has a set of movable jaws for radially clamping against the centering diameter.

8 Claims, 2 Drawing Sheets

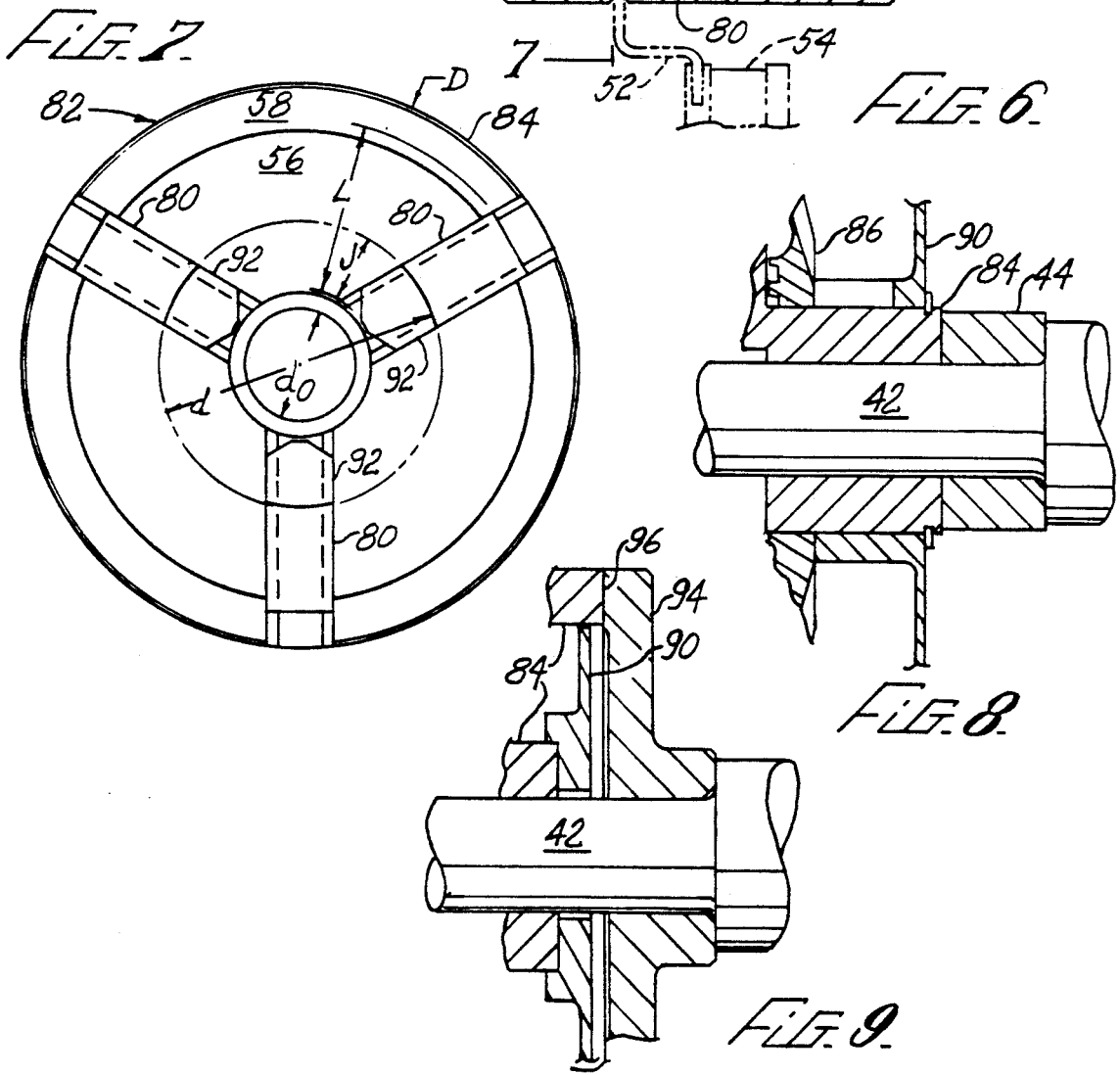

BRAKE ROTO FINISHING ADAPTOR

BACKGROUND

The present invention relates to the finishing, balancing, and especially refinishing of worn surfaces on rotor members such as disk brake rotors, brake drums, and the like.

In refinishing of variously configured brake rotors and the like, and with reference to FIG. 1, it is customary to provide a rotatable spindle 10, a flange 12 on the spindle, and a cone-shaped member 14 axially slidable relative to the spindle for clamping the rotor or workpiece 15 against the flange, the cone-shaped member engaging a bore diameter 16 of the workpiece opposite the flange. Thus the concentricity of the workpiece relative to the spindle is defined by the engagement with the cone-shaped member, and the perpendicularity of the workpiece relative to the spindle is defined by the engagement with the flange member. A disadvantage of this arrangement is that the sliding fit of the cone member on the spindle permits undesired run out of the cone member relative to the spindle. This problem is exacerbated by the typical need for interchangeability of the cone member with other devices on the spindle. Also, the surface of the workpiece that is engaging the cone member is not necessarily accurately formed, being typically a small chamfer or corner radius 18 between the bore diameter and a face surface of the workpiece opposite the flange member. Even worse, there can be burrs on the workpiece that extend axially toward the cone member from around the bore diameter.

A similar prior art arrangement is disclosed in U.S. Pat. No. 4,708,041 to Granger, wherein the flange 12 is integrally formed as shown in FIG. 2 with a cylindrical core 20 that fits over the spindle 10, the cone member 14 having an enlarged internal diameter for slidably engaging the core. This arrangement permits the clearance between the cone member and the core to be more carefully controlled. However, the concentricity of the core itself introduces a new source of uncertainty in locating the cone member. Also the core has a relatively complex shape that must be accurately formed, and is consequently expensive to produce.

With further reference to FIG. 3, a relatively recent development has the workpiece 15, known as a "composite" rotor, being formed with a stamped steel center hat section 22 that is joined to a cast iron disk member 24. The hat section 22, being relatively thin, is subject to flexing under load, such that conventional refinishing procedures can produce unacceptable tool chattering and run out. In an attempt to avoid these problems, a spring-centering adaptor assembly 26 has been developed wherein the cone member 14 is reversed on the core 20, the flange 12 having a cup-shaped configuration enclosing the cone member 14, a helical spring 28 biasing the cone member 14 away from the flange 12. The workpiece 15 is clamped against the flange member 12 by a clamp member 30 that makes ring contact with the workpiece 15 directly opposite the flange member 12. Although this arrangement overcomes at least some of the undesirable distortion of the hat section 22, other problems remain. For example, the cone member 14 can get stuck on the core 20 such that the spring 28 is ineffective for producing full engagement between the cone member 14 and the workpiece 15. Also, the cone member 14 is subject to excessive runout on the core 20 when there is sufficient clearance for effective operation of the spring 28. Further, the weight of the workpiece 15 can interfere with proper engagement by the cone member 14. Moreover, a high level of skill is required for reasonably accurate centering of the workpiece 15 during clamping.

Thus there is a need for apparatus that can reliably and accurately locate variously configured workpieces, especially composite disk brake rotors, on a rotatable spindle, that is easy to use and inexpensive to produce.

SUMMARY

The present invention is directed to an apparatus for refinishing differently configured disk rotors on a spindle member having a clamping arbor nut, each disk rotor having a rotor centering diameter and a rotor mounting surface. The apparatus includes a first flange member having a flange outside diameter and a flange inside diameter for receiving the spindle member; a second flange member having an outside diameter approximately equal to the flange outside diameter and an inside diameter for receiving the spindle member; shoulder means defining a shoulder diameter, the shoulder diameter closely fitting the centering diameter and having not more than one slidably fitting contact surface interface between the shoulder diameter and the spindle member, whereby the rotor is clamped between the flange members by tightening the arbor nut.

The disk rotors can include at least two groups of the rotors, a first group of the rotors having a uniform first centering diameter, a second group of the rotors having a second centering diameter, the shoulder means including a first disk member having a bore accurately formed therein for closely and directly fitting the spindle member, and a first outside diameter for closely fitting the first centering diameter, the apparatus further including a second disk member interchangeable with the first disk member, the second disk member having a counterpart of the accurately formed bore, and a second outside diameter for closely fitting the second centering diameter.

Each of the flange members can have a flange cavity for forming an annular flange surface, the flange surfaces having equal outside diameters and equal inside diameters, the mounting surface being clamped between the flange surfaces by the arbor nut. At least some of the rotors can have the centering diameter formed in an axially projecting centering flange portion, the centering flange portion being received within one of the cavities, the shoulder means also extending into the cavity.

Preferably the shoulder means includes a plurality of jaw members movably connected to the first flange member; and clamp means for driving the jaw members outwardly from the spindle member against the rotor centering diameter, the jaw members being rigidly radially clamped between the first flange member and the centering diameter of the rotor. This configuration advantageously provides rapid and accurate clamping of rotors having a range of centering diameters. The clamp means can include a ring member threadingly engaging the jaw members, and a pinion member for rotatable engagement on a pinion axis fixably located relative to the first flange member, the ring member being rotated relative to the first flange member at high mechanical advantage by the pinion member. Preferably the second flange member is formed for receiving portions of the jaw members.

Each of the flange members can be formed with the annular flange surfaces having. At least some of the rotors can have the centering flange portion that is received within one of the cavities, the shoulder means extending into each of the cavities.

DRAWINGS

These and other features, aspects, and advantages of the present invention will become better understood with reference to the following description, appended claims, and accompanying drawings, where:

FIG. 6 is a sectional elevational view of an alternative configuration of the apparatus of FIG. 5;

FIG. 7 is a fragmentary end sectional view of the apparatus of FIG. 6 on line 7—7 thereof;

FIG. 8 is a sectional elevational detail view showing an alternative configuration of the apparatus of FIG. 6; and FIG. 9 is a sectional elevational detail view showing another alternative configuration of the apparatus of FIG. 6.

DESCRIPTION

Figure 2:
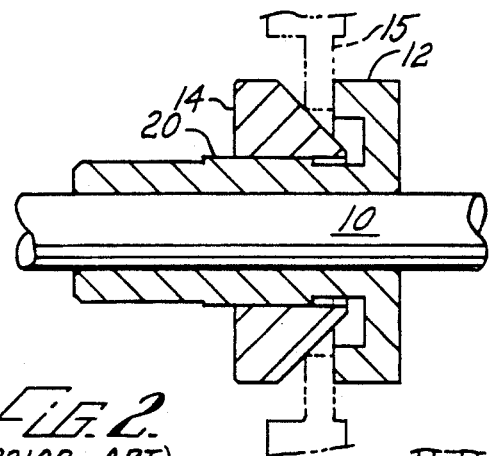
FIG. 2 is a sectional elevational view showing another prior art spindle arrangement.
Figure 1:
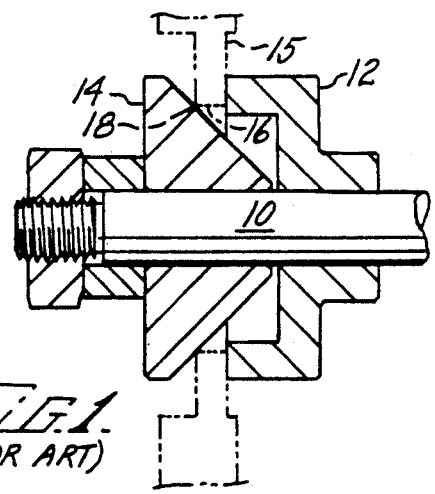
FIG. 1 is an sectional elevational view showing a prior art spindle arrangement for refinishing disk brake rotors.
Figure 3:
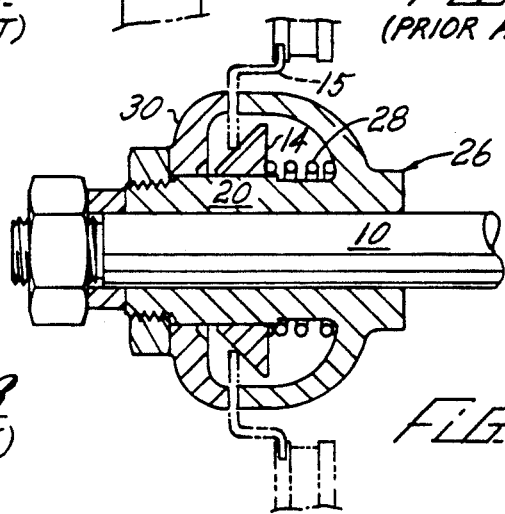
FIG. 3 is a sectional elevational view showing a further prior art arrangement for refinishing composite disk brake rotors.

The present invention is directed to a spindle adaptor apparatus for reliably and accurately mounting a workpiece to be machined or balanced. With reference to FIG. 4, an adaptor apparatus 40 is mounted on a conventional rotor spindle or arbor 42 for rotation on a spindle axis 43, together with appropriate arbor spacers 44, and an arbor nut 46. The apparatus 40 includes a first flange member 48 and a second flange member 50, the flange members 48 and 50 being directly mounted on the arbor 42 for clamping a hat-section member 52 of a composite disk rotor 54 therebetween as described herein.

The first flange member 48 has an outside diameter D and a bore or inside diameter $d_0$, the inside diameter $d_0$ being accurately formed for providing a slip fit directly on the arbor 42, the outside diameter D being less than a hat section diameter $D_h$ of the rotor 54 for clearing same. The first flange member 48 also has an overall width W, one side of the first flange member 48 having a shallow counterbore 56 of diameter $D_L$ therein for forming an annular flange surface 58, the hat-shaped member 52 being axially registered against the flange surface 58. The second flange member 50 is also configured with the same outside diameter D and flange inside diameter $d_0$ as the first flange member 48, the second flange member 50 also having a counterpart of the counterbore 56, designated clamp cavity 60 and having the same counterbore diameter $D_L$ for forming an annular clamp surface 62, the clamp surface 62 and the flange surface 58 contacting directly opposite sides of the hat-shaped member 52 for avoiding distortion thereof when clamping force is applied by tightening the arbor nut 46.

In the configuration of FIG. 4, the second flange member 50 has an axially extending first boss portion 64, the first boss portion 64 having a first shoulder diameter $d_1$ for accurately locating a centering hole 66 of the rotor 54. Typically, the centering hole 66 is formed in a centering flange 68 of the hat-section 52. Axial clearance for the centering flange member 68 is formed by an annular clearance cavity 70 whereby the first shoulder diameter $d_1$ extends within the width W of the second flange member 50. This configuration of the apparatus 40, although very simple and inexpensive to provide, is particularly effective in securely and accurately mounting the rotor 54 to the arbor 42 in that each of the first and second flange members 48 and 50 directly and accurately engage the arbor 42. In this configuration, loose sliding fits between the locating components are not required, and serial plurality of parts engagement between the arbor 42 and the rotor 54 is avoided for preventing undesirable tolerance build-ups.

As further shown in FIG. 4, the second flange member 50 has a second axially extending boss portion 72 that is formed with a second shoulder diameter $d_2$ for centering a different configuration of the rotor 54 having a correspondingly differently sized inside diameter of the centering hole 66. Accordingly, the second flange member 50 also has a second counterpart of the counterbore 56, designated clamp cavity 60'; the clamp surface 62, designated clamp surface 62'; and a counterpart of the clearance cavity 70, designated 70'. Thus the second flange member 50 can be reversed on the arbor 42 for use centering differently configured rotors 54.

Figure 4A:
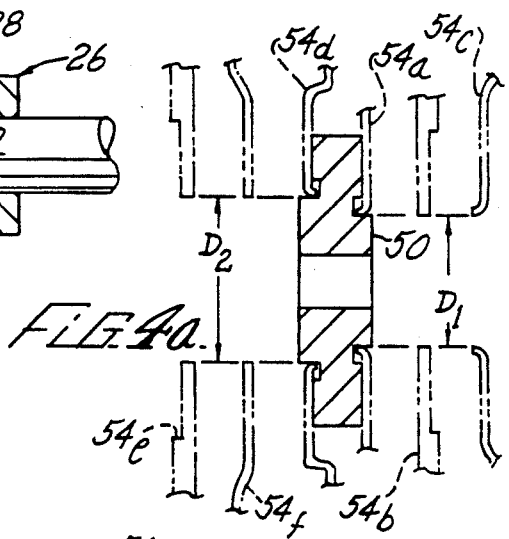
FIG. 4a is a sectional elevational view of a portion of the apparatus of FIG. 4, showing use with groups of brake rotors.
Figure 4:
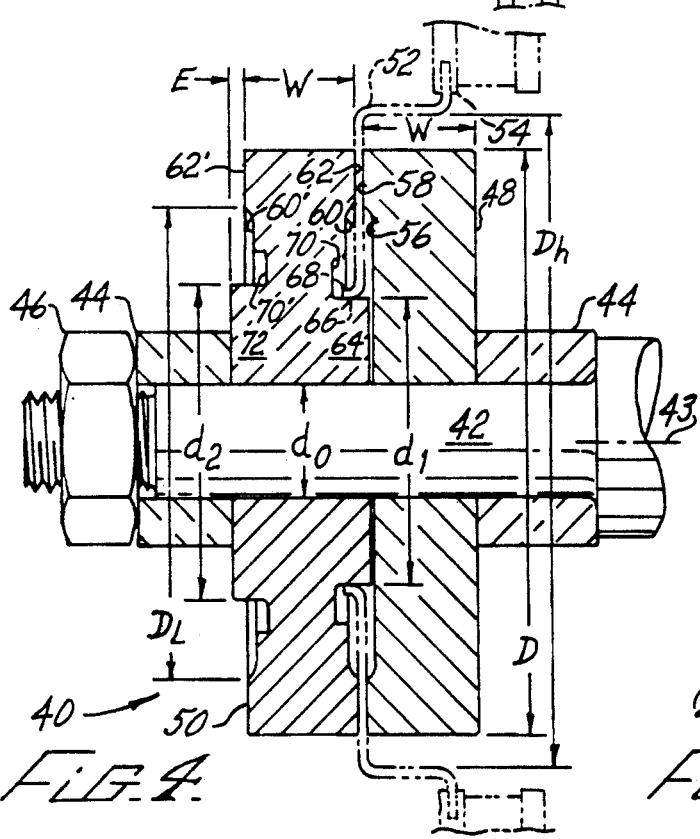
FIG. 4 is a sectional elevational view of a spindle adaptor apparatus according to the present invention.

More particularly, and with further reference to FIG. 4a, the first and second boss portions 64 and 72 of the second flange member 50 permit use of the apparatus 40 with separate groups of the rotors 54. For example, a first group of the rotors having an inside diameter $D_1$ includes rotors designated 54a, 54b, and 54c. A second group of rotors having an inside diameter $D_2$ includes rotors designated 54d, 54e, and 54f. The diameter $D_1$ is not smaller than the first shoulder diameter $d_1$, while the diameter $D_2$ is not smaller than the second shoulder diameter $d_2$. As further shown in FIG. 4a, the respective groups of the rotors can include rotors 54a, 54c, and 54d having the centering flange 68, as well as rotors 54b, 54e, and 54f not having the centering flange 68.

The first and second flange members 48 and 50 can be formed from a variety of materials, but are preferably formed from high-strength steel, steel having a desirable high modulus of elasticity, high strength also being desired for avoiding nicks and scratches that might otherwise impair the locating accuracy of the apparatus 40. A steel alloy suitable for fabricating the first and second flange members 48 and 50 is readily available as ASTM A576 carbon steel alloy. More preferably, the flange members 48 and 50 can be fabricated from 41L47 steel alloy, heat treated to $R_C 32$. This material is dimensionally stable and easy to machine, having a small concentration of lead for its lubricative qualities.

Preferably all locating surfaces of the apparatus 40 are finished to a roughness not exceeding 63 micro inches, with flatness and parallelism within 0.001 inch total indicator reading (TIR), and concentricity within 0.002 inch TIR relative to the flange inside diameter $d_0$.

Figure 5:
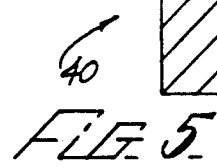
FIG. 5 is a sectional elevational view of an alternative configuration of the apparatus of FIG. 4.

With further reference to FIG. 5, an alternative and preferred configuration of the apparatus 40 includes the first flange member 48, a counterpart of the second flange member 50, designated second flange member 74, and a separate disk member 76 in place of the boss portions 64 and 72 of FIG. 4. The disk member 76 is formed with the bore diameter $d_0$, the flange members 48 and 74 being formed with the same or slightly larger bore. In this configuration of the apparatus 40, a separate one of the disk members 76 is provided for each size of the centering hole 66. Each disk member 76 is particularly inexpensive to provide with the bore diameter $d_0$ and the shoulder diameter d accurately and concentrically formed, the thickness and side parallelism of the disk member 76 being relatively unimportant. Also, the centering of the first and second flange members 48 and 74 is not particularly critical in this configuration. Thus the flange members 48 and 74 need only to be accurately formed for providing precise perpendicularity of the flange surface 58 and the clamp surface 62 relative to the arbor 42. For example, such perpendicularity can be insured by merely controlling the parallelism of opposite sides of the first flange member 48, presuming that appropriate perpendicularity is established by the arbor spacer 44 that contacts the first flange member 48. The other arbor spacer 44 can have a conventional self-aligning configuration. Alternatively, both of the spacers 44 can be self-aligning, the perpendicularity being established between the inside diameter of the first flange member 48 (and/or the second flange member 74) and the flange surface 58.

As further shown in FIG. 5, the disk member 76 extends slightly within each of the first and second flange members 48 and 74 during clamping of the rotor 54, the disk member 76 extending a greater distance into the second flange member 74 for effective engagement with the centering flange 68 of the hat-section member 52. For this purpose, a counterpart of the annular flange cavity 58 is created by extension of the disk member 76 into a cavity counterbore 78 that is formed in the second flange member 74.

With further reference to FIGS. 6 and 7, another and more preferred alternative configuration of the apparatus 40 includes a plurality of jaw members 80 radially movable in a chuck assembly 82 having a counterpart of the first flange member, designated chuck body 84, for radially clampingly engaging the centering hole 66 of the centering flange 68. The chuck body 84 is accurately machined with the flange inside diameter $d_0$ closely fitting the arbor 42, and having the counterbore 56 and the annular flange surface 58 integrally formed therein. The jaw members 80 are formed for radially slidably engaging the body 84 in an equally angularly spaced configuration according to conventional lathe chuck construction, the body 84 rotatably carrying a bevel-geared scroll member 86 that threadably engages the jaw members 80 for radially advancing same in response to one or more socketed bevel pinion members 88 that are also carried in a conventional manner by the chuck body 84. The chuck assembly 82 also includes a flanged retainer member 90 for covering a rear portion of the chuck body 84, and for retaining the scroll member 86 therein, in a manner known to those having skill in the art of lathe chucks. As shown in FIG. 6, the retainer member 90 axially engages one of the arbor spacers 44 for supporting the chuck assembly 82 against loading by the second flange member 74 in response to tightening of the arbor nut 44.

With further reference to FIG. 8, an alternative configuration of the chuck assembly 82 has a portion of the chuck body 84 protruding the retainer member 90 for permitting direct contact between the body 84 and the arbor spacer 44. This configuration advantageously promotes alignment of the flange surface 58 perpendicular to the arbor 42 by avoiding clamping contact against the retainer member 90, there being no possibility of cocking of the chuck body 84 as a result of axial runout of the retainer member 90.

In another alternative configuration, and with further reference to FIG. 9, an auxiliary flange member 94 axially supports a rear mounting flange surface 96 of the chuck body 84. This configuration also advantageously avoids clamping contact against the retainer member 90 for the reasons indicated above, and is facilitated when the chuck body 84 has the rear flange surface 96 accurately machined for mating a lathe chuck flange (not shown), or as a tooling surface.

As best shown in FIG. 6, the jaw members 80 are formed with a single projection 92 that extends axially within the counterbore 56, beyond the flange surface 58, and into the annular clearance cavity 70 of the second flange member 74 for engaging the centering flange 68 at the diameter d as described above. In accordance with the present invention, only the projection 92 of each jaw 80 extends into the counterbore 56, for clearing the centering flange 68 of the disk rotor 54. Each of the jaws 80 has a radial length L, the projections 92 having a radial depth J as shown in FIG. 7, the depth J being less than a spacing between the centering hole 66 and the arbor 42 for permitting radial movement of the jaws 80 therebetween when mounting the disk rotor 54 onto the apparatus 40. Accordingly, the apparatus 40 in the configuration of FIGS. 6 and 7 is capable of accurately centering rotors 54 having a range of sizes of the centering hole 66. For example, when the flange inside diameter $d_0$ is 1.0 inch, the diameter D is 5.0 inches, the jaw length L is 1.4 inches, and the depth J is 0.5 inch, the jaws 80 are capable of clamping with the diameter d being between a counterpart of the first shoulder diameter $d_1$ of approximately 2.0 inches to a counterpart of the second shoulder diameter $d_2$ of approximately 4.0 inches when the hat section diameter $D_h$ is not less than 5.8 inches. More generally, $d_1 \geq d_0 + 2J$, and $D - 2(x-J) \geq d_2 \leq D_h - 2(L-J)$, where x represents a minimum radial engagement of the jaw members 80 within the outside diameter D of the chuck body 84 (approximately 1.0 inch). When it is desired to accommodate rotors 54 having larger centering holes 66, and/or hat section diameters $D_h$ more closely clearing the chuck body 82, the depth J of the jaw projection 92 can be increased, either in a single set of the jaws 80, or in one of a plurality of sets of the jaws 80. Conversely, the depth J can be reduced for accommodating centering holes 66 of less than 2.0 inches diameter.

The adapter apparatus 40 in the configuration of FIGS. 5 and 6 according to the present invention is particularly advantageous in that separately machined shoulders are not required for locating rotor centering holes 66 over the range of $d_1$ to $d_2$. Also, the radial location of the rotor 54 by the jaws 80 is not subject to uncertainty as a result of variations in the size of the centering hole 66, because the jaws 80 positively clamp outwardly within the centering flange 68. Further, when the jaw members 80 are advanced against the centering hole 66 by the scroll member 86, the jaw members 80, the scroll member 86, and the chuck body 84 assume a solid configuration wherein the only surface having a sliding clearance engagement is that between the arbor 42 and the chuck body 84 (at the diameter $d_0$). Moreover, the flange inside diameter $d_0$ of the chuck body 84 can normally be made more closely fitting on the arbor 42 than in the configurations of FIGS. 4 and 5, because the single chuck assembly 82 is operable with a variety of configurations of the disk rotor 54.

Although the present invention has been described in considerable detail with reference to certain preferred versions thereof, other versions are possible. For example, the flange members 48 and 74, the disk member 76, and the chuck body 84 can be machined from solid stock, or they can be formed as castings, with critical surfaces thereof being machined. Therefore, the spirit and scope of the appended claims should not necessarily be limited to the description of the preferred versions contained herein.

What is claimed is:

1. An apparatus for refining differently configured disk rotors on a spindle member having a clamping arbor nut, each disk rotor having a rotor centering diameter and a rotor mounting surface, the rotors including at least two groups of the rotors, a first group of the rotors having a uniform fist centering diameter, a second group of the rotors having a second centering diameter, the apparatus comprising:
   (a) a first flange member having a flange outside diameter, and a flange inside diameter for receiving the spindle member;
   (b) a second flange member having an outside diameter approximately equal to the flange outside diameter of the first flange member and an inside diameter for receiving the spindle member;
   (c) shoulder means defining a shoulder diameter, the shoulder diameter closely fitting the centering diameter and having not more than one slidably fitting contact surface interface between the shoulder diameter and the spindle member, the shoulder means comprising a first disk member having a bore accurately formed therein for closely and directly fitting the spindle member, and a first outside diameter for closely fitting the first centering diameter,
   whereby the rotor is clamped between the flange members by tightening the arbor nut; and
   (d) a second disk member interchangeable with the first disk member, the second disk member having a counterpart of the accurately formed bore, and a second outside diameter for closely fitting the second centering diameter.

2. The apparatus of claim 1, wherein each of the flange members has a cavity for forming an annular flange surface, the flange surfaces having equal outside diameters and equal inside diameters, the mounting surface being clamped between the flange surfaces by the arbor nut.

3. The apparatus of claim 2, wherein at least some of the rotors have the centering diameter formed in an axially projecting centering flange portion, the centering flange portion being received within one of the cavities, the shoulder means also extending into that cavity.

4. An apparatus for refinishing differently configured disk rotors on a spindle member having a clamping arbor nut, each disk rotor having a rotor centering diameter and a rotor mounting surface, the apparatus comprising:
   (a) a first flange member having a flange outside diameter, and a flange inside diameter for receiving the spindle member;
   (b) a second flange member having an outside diameter approximately equal to the flange outside diameter of the first flange member and an inside diameter for receiving the spindle member;
   (c) shoulder means defining a shoulder diameter, the shoulder diameter closely fitting the centering diameter and having not more than one slidably fitting contact surface interface between the shoulder diameter and the spindle member, the shoulder means comprising:
      (i) a plurality of jaw members movably connected to the first flange member; and
      (ii) clamp means for driving the jaw members outwardly from the spindle member against the rotor centering diameter, the jaw members being rigidly radially clamped between the first flange member and the centering diameter of the rotor, whereby the rotor is clamped between the flange members by tightening the arbor nut.

5. The apparatus of claim 4, wherein the clamp means comprises a ring member threadingly engaging the jaw members, and a pinion member for rotatable engagement on a pinion axis fixably located relative to the first flange member, the ring member being rotated relative to the first flange member at high mechanical advantage by the pinion member.

6. The apparatus of claim 4, wherein the second flange member is formed for receiving portions of the jaw members.

7. The apparatus of claim 4, wherein each of the flange members has a cavity for forming a substantially annular flange surface, the flange surfaces having approximately equal outside diameters and approximately equal inside diameters, the mounting surface being clamped between the flange surfaces by the arbor nut.

8. The apparatus of claim 7, wherein the rotor has a centering diameter formed in an axially projecting centering flange portion, the centering flange portion being received within one of the cavities, the shoulder means extending into each of the cavities.

* * * * *